United States Patent
Patri

(10) Patent No.: US 10,268,851 B2
(45) Date of Patent: Apr. 23, 2019

(54) METHOD FOR INTERACTION BETWEEN A DATA PROCESSING DEVICE AND A MOBILE DEVICE, AND ARRANGEMENT FOR CARRYING OUT THE METHOD

(71) Applicant: Schneider Electric Industries SAS, Rueil-Malmaison (FR)

(72) Inventor: Michael Patri, Aschaffenburg (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/699,056

(22) Filed: Sep. 8, 2017

(65) Prior Publication Data
US 2018/0068141 A1    Mar. 8, 2018

(30) Foreign Application Priority Data
Sep. 8, 2016  (EP) .................................. 16 187 733

(51) Int. Cl.
G06K 7/10    (2006.01)
G06K 7/14    (2006.01)
(Continued)

(52) U.S. Cl.
CPC ... *G06K 7/10722* (2013.01); *G06F 17/30879* (2013.01); *G06F 21/123* (2013.01);
(Continued)

(58) Field of Classification Search
CPC ............. G06K 7/10722; G06K 7/1413; G06K 7/1417; G06K 19/06018; G06K 19/06037;
(Continued)

(56) References Cited

U.S. PATENT DOCUMENTS

| 2003/0085877 A1* | 5/2003 | Wu ....................... G06F 3/0383 345/166 |
| 2012/0094348 A1* | 4/2012 | Pye .......................... C12P 7/10 435/162 |

(Continued)

FOREIGN PATENT DOCUMENTS

WO    WO2016/125732 A1    6/2017

OTHER PUBLICATIONS

European Search Report dated Dec. 21, 2016, for EP Application No. 16187733.7.

*Primary Examiner* — Karl D Frech
(74) *Attorney, Agent, or Firm* — Ladas & Parry LLP; Malcolm J. MacDonald

(57) ABSTRACT

A method and arrangement for interaction between a data processing device and a mobile device for the activation of a software action in the data processing device, including the steps:
- representation of request information on a display unit of the data processing device,
- acquisition of the request information with an optical sensor of the mobile device,
- generation of reply information in or via the mobile device, and
- representation of the reply information on a display of the mobile device.

To simplify transmission of the reply information to the data processing device and to increase the security of the data transmission, the reply information is read using an optical reading device coupled to the data processing device and transmitted to the data processing device for the automatic activation of the software action, wherein the data processing device is not connected to the data network at least during data transmission.

14 Claims, 1 Drawing Sheet

(51) Int. Cl.

| | |
|---|---|
| G06K 19/06 | (2006.01) |
| G06F 17/30 | (2006.01) |
| G06F 21/12 | (2013.01) |
| G06F 21/36 | (2013.01) |
| G06Q 20/12 | (2012.01) |
| G06Q 20/32 | (2012.01) |
| G06Q 20/38 | (2012.01) |
| G06Q 20/42 | (2012.01) |
| H04L 29/06 | (2006.01) |
| G06F 21/44 | (2013.01) |
| G06F 21/62 | (2013.01) |
| G06F 3/03 | (2006.01) |
| H04M 1/02 | (2006.01) |
| H04N 5/372 | (2011.01) |

(52) U.S. Cl.
CPC .............. *G06F 21/36* (2013.01); *G06F 21/44* (2013.01); *G06F 21/629* (2013.01); *G06K 7/1413* (2013.01); *G06K 7/1417* (2013.01); *G06K 19/06018* (2013.01); *G06K 19/06037* (2013.01); *G06Q 20/1235* (2013.01); *G06Q 20/322* (2013.01); *G06Q 20/385* (2013.01); *G06Q 20/38215* (2013.01); *G06Q 20/42* (2013.01); *H04L 63/0853* (2013.01); *G06F 3/0304* (2013.01); *H04M 1/0264* (2013.01); *H04M 1/0266* (2013.01); *H04N 5/372* (2013.01)

(58) Field of Classification Search
CPC . G06F 3/0304; H04M 1/0264; H04M 1/0266; H04M 5/372
USPC ............................................ 235/462; 99/569
See application file for complete search history.

(56) References Cited

U.S. PATENT DOCUMENTS

| | | | |
|---|---|---|---|
| 2013/0130329 A1* | 5/2013 | Hsu .......................... | C12P 19/02 435/101 |
| 2014/0020571 A1* | 1/2014 | Bajema .................... | A23N 5/00 99/569 |
| 2014/0168716 A1* | 6/2014 | King ...................... | G06Q 10/10 358/473 |
| 2014/0255575 A1* | 9/2014 | Bhushan .................. | A23N 4/24 426/484 |
| 2014/0310174 A1 | 10/2014 | Heeter | |
| 2014/0351589 A1 | 11/2014 | Chenna | |
| 2016/0132891 A1 | 5/2016 | MacKinnon | |

* cited by examiner

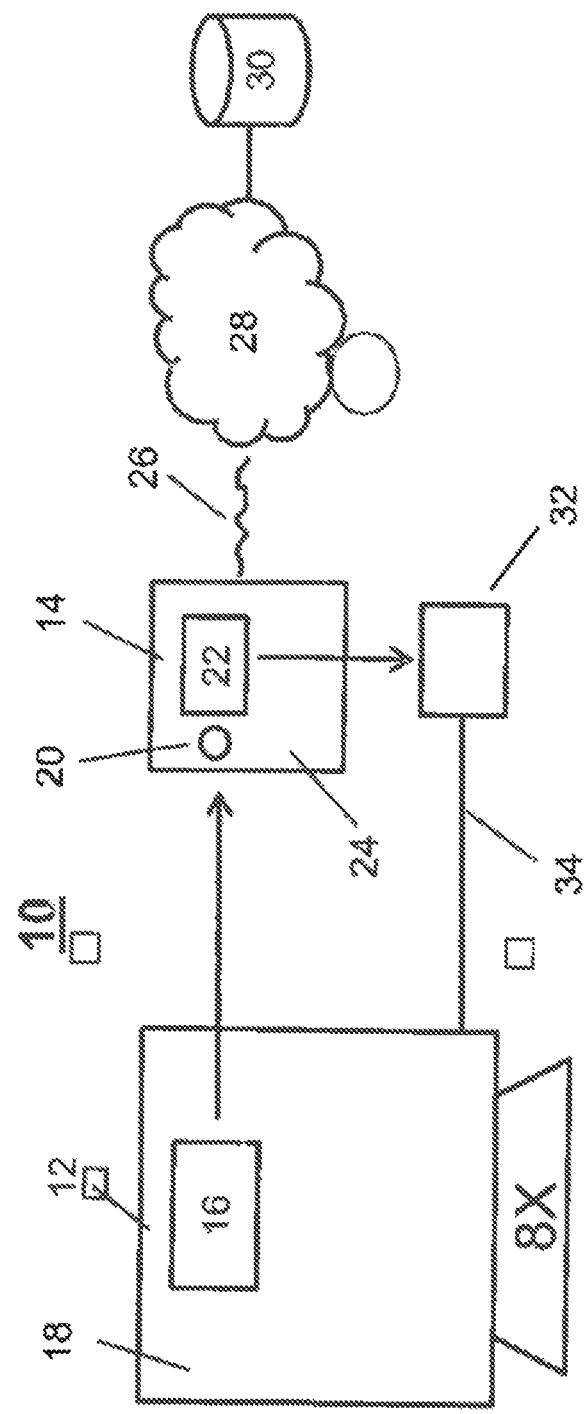

METHOD FOR INTERACTION BETWEEN A DATA PROCESSING DEVICE AND A MOBILE DEVICE, AND ARRANGEMENT FOR CARRYING OUT THE METHOD

The invention relates to a method for interaction between a data processing device such as a personal computer and a mobile device such as a smartphone for the activation of a software action in the data processing device according to the preamble of claim 1 as well as to an arrangement for carrying out the method according to the preamble of claim 6.

A method of the type mentioned at the start is known from the prior art, for example, in connection with the licensing of software or the performance of a transfer transaction.

For the unlocking of software, request information is represented on a display of the data processing device. According to the prior art, this request information is acquired by means of a mobile device in the form of a smartphone and sent via a communication network such as, for example, the Internet to a licensing server. Reply information in the form of an unlock code is sent by the licensing server to the mobile device and represented on a display of the mobile device.

According to the prior art, the unlock code is then entered manually via a keyboard in the data processing device in order to unlock the software.

Usually, an unlock code in the form of an alphanumerical character string is represented. Errors can occur in the manual entering of the character string in the data processing device. Due to increasing security requirements, the character strings have more and more characters, so that the manual entering of the character string is associated with time expenditure and risk of error.

US 2016/132891 A1 relates to different embodiments of systems and methods for self payment and verification of the purchase of retail goods and services. According to an embodiment, a method for verifying the purchase using a mobile electronic device in wireless communication with a payment verification system and a code generation system is provided, wherein the method comprises the following steps: receiving from a consumer information identifying an item for purchase, receiving from a consumer information identifying payment means for purchasing the item for purchase, processing the information and generating a unique QR code indicating a purchase of the item, sending the unique QR code to a mobile device for display by a consumer to the vendor of the item for purchase.

WO 2016/125732 A1 relates to an optical terminal and to a scanning program that is easy to operate. The optical device acquires an overall picture of a region to be scanned and comprises: an image acquisition unit which contains an imaging element and reproduces the regions in the region to be scanned and acquires unit image data of the region; a position information acquisition unit which acquires image position information corresponding to the unit image data, and an image synthesizing unit which synthesizes the plurality of unit image data, in order to generate the overall picture of the region to be scanned.

US 2014/351589 A1 relates to a method for authenticating users who access computer applications, for example, an application hosted in a cloud environment, which is accessed by a plurality of computer systems.

US 2014/310174 A1 relates to an electronic payment system, wherein electronic payments are carried out by scanning a 2D code which is located in the vicinity of the point of sale, with the mobile telephone of the client, and wherein the code or the data embodied by the code is transmitted to a payment center in which the account of a merchant can be credited, and the account of the customer is debited without transmission of account information.

Based on this, the aim of the present invention is to develop a method and an arrangement of the type mentioned at the start, in such a manner that, on the one hand, the interaction between the data processing device and the mobile device is simplified, and, on the other hand, the risk of input errors is minimized The aim is achieved according to the invention in that, inter alia, the reply information represented on the display of the mobile device is read by means of an optical reading device coupled to the data processing device and is transmitted to the data processing device for the automatic activation of the software action.

The invention is based on the idea of reading the reply information, which is represented on the display unit of the mobile device, in the form of image information by means of an optical reading device such as a CCD camera, a laser scanner or an optical mouse such as a laser mouse, with integrated image sensor. For this purpose, the optical mouse is preferably moved over the reply information represented on the display of the mobile device, in order to scan the reply information and transmit it to the data processing device.

The reply information is preferably generated by coded image information such as a QR code or a barcode, by means of which, in comparison to a conventional alphanumerical character string, an increased coding level can be reached.

The reply information can be generated in the mobile device itself or retrieved by the mobile device from a server such as a licensing server and then be displayed on the display of the mobile device.

Moreover, the invention relates to an arrangement for carrying out the method, comprising a data processing device with a display unit, wherein the data processing device is designed to represent request information on the display unit, and a mobile device with an optical reading device, which is designed to acquire the request information on the display unit of the data processing device and to generate reply information or retrieve it from a server via a data connection and display it. In comparison to the prior art, the arrangement is characterized in that the data processing device is designed to acquire the reply information represented on the display of the mobile device and automatically activate a software action.

The data processing device preferably comprises an optical reading device such as a CCD camera, a laser scanner or an optical mouse such as a laser mouse with integrated data sensor for the acquisition of the reply information.

The optical reading device is coupled via a wireless connection or a wire connection to the data processing device, and the mobile device is preferably coupled to a network such as the Internet in order to obtain access to an external server. Preferably, the optical reading device is an integral component of the data processing device.

Additional details, advantages and features of the invention result not only from the claims, the features to be obtained therefrom—individually or in combination—, but also from the following description of a preferred embodiment example to be obtained from the drawing.

BRIEF DESCRIPTION OF THE DRAWING

FIG. 1 shows an arrangement for interaction between a data processing device and a mobile device for the activation of a software action.

The single FIGURE shows an arrangement 10 for interaction between a data processing device 12 such as personal computer or an automated device and a mobile device 14 such as a smartphone for the activation of a software action, for example, the unlocking of an installed software application or transaction of a transfer.

According to the invention it is provided that, in the data processing device 12, for the unlocking of the action, first request information 16 is represented on a display unit 18. The request information 16, for example, in the form of a QR code, is read in by means of an optical sensor 20 of the mobile device 14. The mobile device 14 can be designed in order to independently generate, on the basis of the reply information 16 which has been read in, reply information 22 which is displayed on a display unit 24 of the mobile device.

Alternatively, the possibility also exists that the mobile device 14 calls up a web portal via a communication connection 26 and via a network 28 such as the Internet and calls up the reply information 22 from a server 30 such as a licensing server, for example, and then displays said reply information on the display 24.

According to the invention, the data processing device 12 is designed in such a manner as to automatically read in by means of an optical reading device 32 the reply information 22 represented on the display unit 24 of the mobile device 14. The reply information which has been read in is used in the data processing device for unlocking the action, in the present case a software application.

In the embodiment example represented, the optical reading device 32 is designed as an optical mouse which comprises an image sensor for the acquisition of the query information 22. Alternatively, the optical reading device 32 can also be designed as a camera such as a CCD camera or a laser scanner. In the embodiment example represented, the optical reading device is connected via a cable connection 34 to the data processing device. Alternatively, the optical reading device 32 can also be coupled via a wireless connection to the data processing device. Furthermore, the possibility exists that the optical reading device 32 is an integral component of the data processing device, i.e., a CCD camera which is part of the device.

By the method according to the invention or the arrangement according to the invention, the advantage achieved in comparison to the prior art is that a bidirectional optical data transmission between the data processing device and the mobile device is enabled, with the result that alphanumerical character strings for the unlocking of software, for example, or for the authorization of a bank transaction can be transmitted in a simple and error-free manner. Another particular advantage of the method consists in that, during the data transmission, the data processing device does not need to be connected to a data network such as the Internet, so that the risk of data manipulation and/or undesired "reading along" of third parties is reduced.

The invention claimed is:

1. A method for interaction between a data processing device and a mobile device for activating a software action in the data processing device, the method comprising:
   representing request coded image information on a display unit of the data processing device;
   acquiring the request coded image information with an optical sensor of the mobile device;
   generating reply coded image information for activating the software action on the basis of the request coded image information in the mobile device, or retrieving the request coded image information via a data connection by the mobile device and a data network in a server; and
   representing the reply coded image information on a display of the mobile device;
   wherein the reply coded image information is read by means of an optical reading device coupled to the data processing device, and is transmitted to the data processing device for the automatic activation of the software action, wherein the data processing device is not connected to the data network, at least during the data transmission.

2. The method according to claim 1, wherein the reply coded image information is read into the data processing device using a camera or scanner.

3. The method according to claim 2, wherein the camera is a CCD camera, and the scanner is a laser scanner.

4. The method according to claim 1, wherein the reply coded image information is read into the data processing device using an optical mouse with an integrated image sensor.

5. An arrangement for carrying out the method according to claim 1, comprising a data processing device with a display unit, an optical reading device, wherein the data processing device is designed in order to represent request coded image information on the display unit for activating a software action, a mobile device with an optical reading device, wherein the mobile device is designed to read the request coded image information and generate a reply coded image information for activating the software action on the basis of the request coded image information in the mobile device, or retrieving the request coded image information via a data connection by the mobile device and a data network in a server, and display reply coded image information on a display unit;
   wherein the data processing device is designed in order to optically acquire the reply coded image information represented on the display unit of the mobile device and automatically activate the software action, wherein the data processing device is not connected to the data network, at least during the data transmission.

6. The arrangement according to claim 5, wherein the data processing device comprises an optical reading device for the acquisition of the reply coded image information.

7. The arrangement according to claim 5, wherein the optical reading device is a camera, a scanner, or an optical mouse with an integrated image sensor.

8. The arrangement according to claim 7, wherein the camera is a CCD camera.

9. The arrangement according to claim 5, wherein the optical reading device is coupled via a wireless connection or a cable connection to the data processing device, or the optical reading device is an integral component of the data processing device, and/or that the mobile device is coupled to a network.

10. The arrangement according to claim 9, wherein the network is the Internet.

11. The arrangement according to claim 5, wherein the coded image information is a QR code, or a barcode.

12. The method according to claim 1, wherein the data processing device is a personal computer, and the mobile device is a smartphone.

13. The method according to claim 1, wherein the coded image information is a QR code, or a barcode.

14. The method according to claim 1, wherein the server is a licensing server.

* * * * *